US012762879B2

(12) United States Patent
Kamisono et al.

(10) Patent No.: US 12,762,879 B2
(45) Date of Patent: Oct. 13, 2026

(54) IMAGE READING APPARATUS FOR DIVIDING READ DOCUMENT IMAGES INTO DOCUMENTS

(71) Applicant: KYOCERA Document Solutions Inc., Osaka (JP)

(72) Inventors: Kota Kamisono, Osaka (JP); Kunihiko Tanaka, Osaka (JP); Naomichi Higashiyama, Osaka (JP); Noa Kaneda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 217 days.

(21) Appl. No.: 18/776,386

(22) Filed: Jul. 18, 2024

(65) Prior Publication Data

US 2025/0029414 A1 Jan. 23, 2025

(30) Foreign Application Priority Data

Jul. 21, 2023 (JP) ................................ 2023-119494

(51) Int. Cl.
*G06V 30/412* (2022.01)
*G06V 30/416* (2022.01)

(52) U.S. Cl.
CPC .......... *G06V 30/412* (2022.01); *G06V 30/416* (2022.01)

(58) Field of Classification Search
CPC ........................... G06V 30/412; G06V 30/416
See application file for complete search history.

(56) References Cited

U.S. PATENT DOCUMENTS 8,068,261 B2 * 11/2011 Kobayashi ............. H04N 1/387 358/450
11,030,446 B2 * 6/2021 Yanamandra ........ G06V 30/416
11,935,316 B1 * 3/2024 Rangarajan ............ G06V 10/82
12,094,231 B1 * 9/2024 Buban .................... G06V 10/82
12,217,525 B1 * 2/2025 Rangarajan ...... G06V 30/19173
2019/0141203 A1 * 5/2019 Morita ................. H04N 1/3873

FOREIGN PATENT DOCUMENTS

JP 2022100432 A 7/2022

* cited by examiner

*Primary Examiner* — Utpal D Shah
(74) *Attorney, Agent, or Firm* — IP Business Solutions, LLC.

(57) ABSTRACT

In an image reading apparatus, the image reading apparatus reads a document bundle to acquire a document image, and determines a first page of the document image according to the selected division method by a user. A page number recognizer extracts a page number from the document image by executing page number recognition processing, and determines the document image indicating a first page to be a first page of the document. A layout recognizer detects a marginal area or background color from the document image by executing layout recognition processing, and determines the first page of the document. A title recognizer extracts a title by executing title recognition processing and determines the first page of the document. A divider divides the document image into documents on the basis of the determined first page, converts the divided document images into files, and stores the files in a storage device.

2 Claims, 12 Drawing Sheets

IMAGE READING APPARATUS FOR DIVIDING READ DOCUMENT IMAGES INTO DOCUMENTS

INCORPORATION BY REFERENCE

This application claims priority to Japanese Patent Application No. 2023-119494 filed on Jul. 21, 2023, the entire contents of which are incorporated by reference herein.

BACKGROUND

The present disclosure relates to an image reading apparatus that reads a document bundle including a plurality of types of documents and divides a document image into documents.

A method of dividing a plurality of pieces of document data into documents on the basis of history information related to an execution history of a workflow has been proposed. The history information includes information on at least one of document layout, font, creation date, title, footer, background image, watermark, and logo.

SUMMARY

As one aspect of the present disclosure, a technology that is a further improvement on the above technology is proposed. An image reading apparatus according to one aspect of the present disclosure includes an image reading apparatus and a control device. The image reading apparatus acquires document images of a plurality of pages obtained by reading a document bundle including a plurality of documents one by one. The control device includes a processor, and functions as a page number recognizer, a layout recognizer, a title recognizer, a controller, and a divider by the processor executing a control program. The page number recognizer recognizes a page number of each document image and determines a first page of the document in the document images of the plurality of pages acquired by the image reading apparatus. The layout recognizer recognizes a marginal area width and background color of each document image and determines the first page of the document. The title recognizer recognizes a title from each document image and determines the first page of the document. The controller causes the page number recognizer, the layout recognizer, or the title recognizer to determine whether each document image is the first page of the document. The divider divides the document images into the same type of documents using a result of the determination as to whether or not each document image is the first page of the document by the page number recognizer, the layout recognizer, or the title recognizer that has performed the determination.

DETAILED DESCRIPTION

Figure 1:
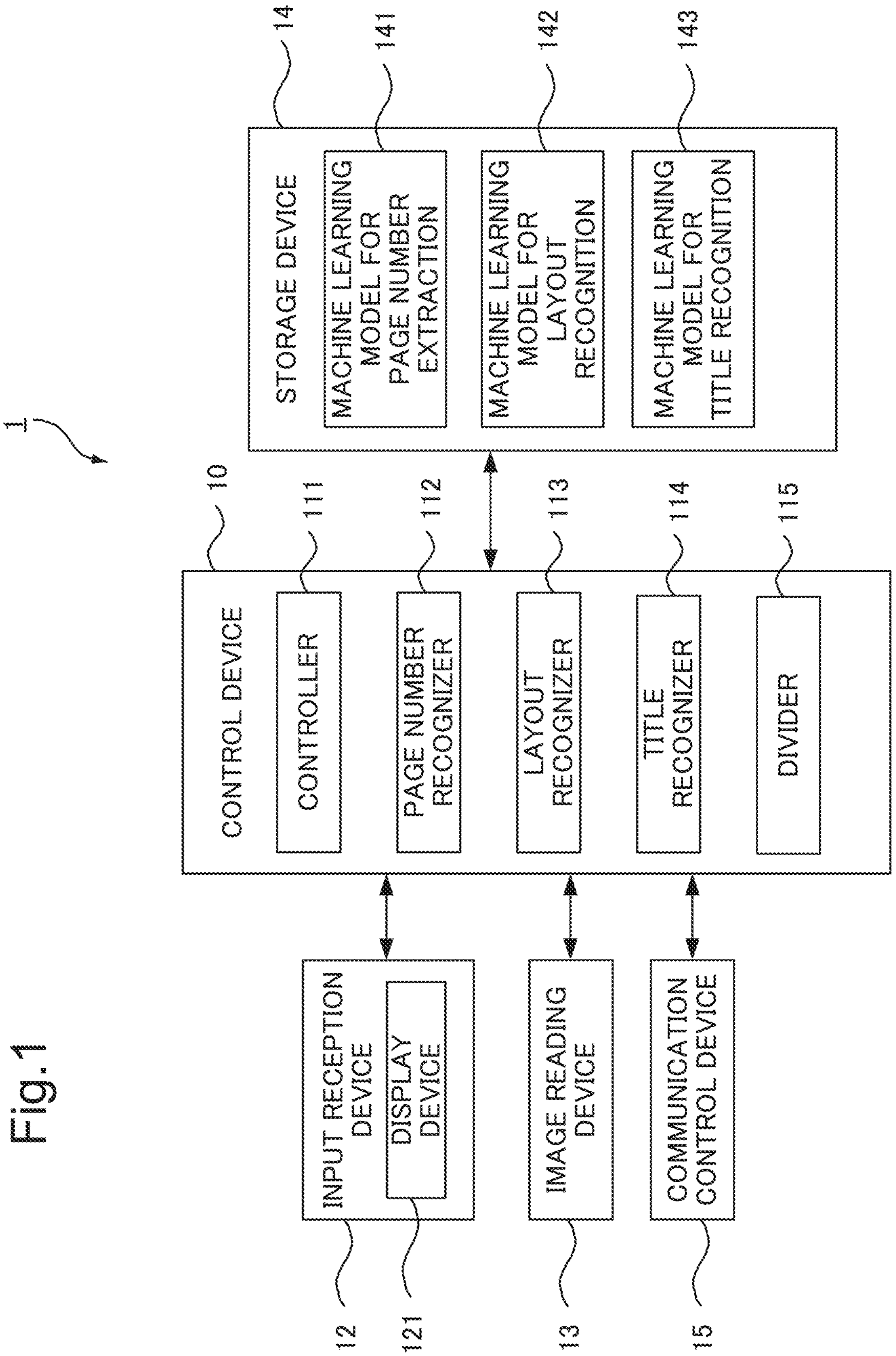
FIG. 1 is a diagram showing an electrical configuration of an image reading apparatus according to an embodiment of the present disclosure.

Hereinafter, an information processing device and an image reading apparatus according to an embodiment of the present disclosure will be described with reference to the drawings. In the present embodiment, an image reading apparatus including an information processing device according to the present disclosure will be described as an example. FIG. 1 is a diagram showing an electrical configuration of the image reading apparatus according to the embodiment of the present disclosure.

An image reading apparatus 1 includes a control device 10, an input reception device 12, an image reading apparatus 13, a storage device 14, a communication control device 15, and the like. The input reception device 12 includes hard keys such as an enter key for performing an operation of confirming various operations or settings, and a start key, and a display device 121. The display device 121 displays operation screens, messages, and the like. The display device 121 may be configured integrally with a touch panel.

The image reading apparatus 13 includes, for example, a scanner, and reads an image of a document to acquire a document image. Further, the image reading apparatus 13 also includes an automatic document feeding device (not shown) and can continuously read a document bundle consisting of a plurality of documents. The communication control device 15 is configured of a communication module or the like, and performs transmission and reception of various pieces of data to and from an external device via a network.

The storage device 14 is a large-capacity storage device configured of an SSD or HDD that stores image data, various programs, data tables, and the like. The storage device 14 stores a machine learning model for page number extraction 141, a machine learning model for layout recognition 142, and a machine learning model for title recognition 143.

The machine learning model for page number extraction is trained to extract page number candidates from a character area of the document image. The machine learning model for layout recognition 142 is trained to determine whether the latest read document image is the same document as the document image one page before, on the basis of a marginal area width and background color of the document image. The machine learning model for title recognition 143 is trained to extract title candidates from the character area of a document image.

The control device 10 is configured of a processor, a random access memory (RAM), a read only memory (ROM), and the like. The processor is a central processing unit (CPU), a micro processing unit (MPU), an application specific integrated circuit (ASIC), or the like. The control device 10 functions as a controller 111, a page number recognizer 112, a layout recognizer 113, a title recognizer 114, and a divider 115 by the processor executing a control program stored in a ROM or the like. Each of the components of the control device 10 may be configured by a hardware circuit without depending on an operation based on the control program.

The controller 111 controls an overall operation of the image reading apparatus 1. The page number recognizer 112 recognizes a page number of each document image. The layout recognizer 113 detects the marginal area width and the background color of each document image. The title recognizer 114 extracts a title of each document image. The divider 115 performs document dividing processing for dividing the document images of the document bundle read by the image reading apparatus 13.

Figure 2:
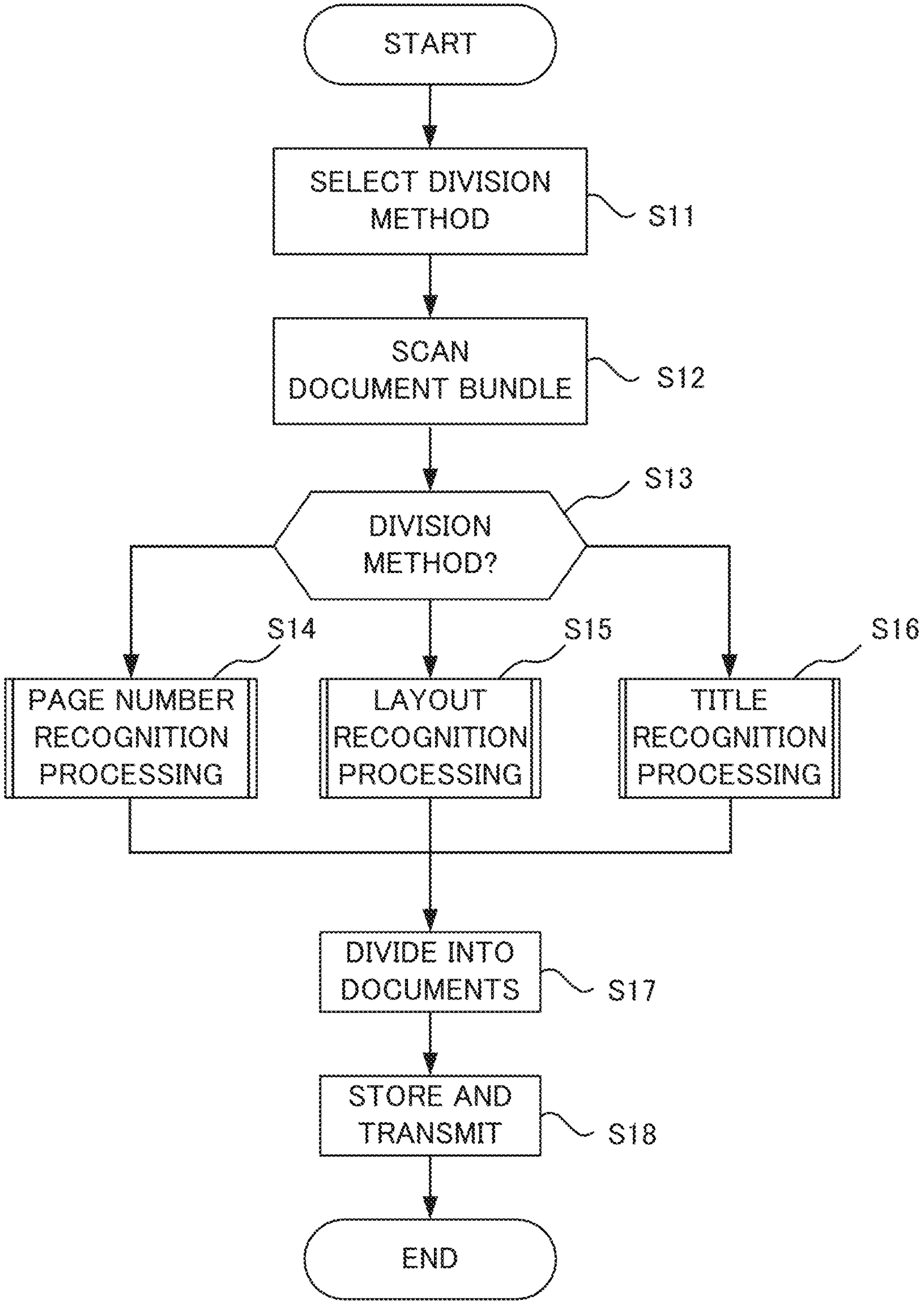
FIG. 2 is a flowchart illustrating a flow of the document division processing.

Here, document division processing will be described. FIG. 2 is a flowchart showing a flow of the document division processing. First, a user operates the input reception device 12 to input a selection instruction to select a document division method. The controller 111 receives the selection instruction (S11). The document division methods include a method of using a page number of a document image, a method of using a marginal area width and background color of a document image, and a method of using a title included in a document image. A selection instruction to select one or a plurality of methods is input through an operation performed on the input reception device 12 by the user, and received by the controller 111.

The selection instruction to designate the document division method from the user may be received by the controller 111 each time the user scans a document bundle. Further, an administrator of the image reading apparatus 1 may input one of the methods as an initial value by operating the input reception device 12, and the controller 111 may execute the document division method indicated by the initial value as the default. In this case, the controller 111 may change the default document division method according to the instruction from the user input to the input reception device 12.

The image reading apparatus 13 reads the document bundle to acquire the document images under the control of the controller 111 (S12). The controller 111 temporarily stores each document image obtained by reading the document using the image reading apparatus 13 in a predetermined storage area such as a nonvolatile memory built in the control device 10, together with information indicating a reading order. Thereafter, the controller 111 executes the document division processing (S14, S15, and S16) using the document division method indicated by the selection instruction (S13).

Figure 3:
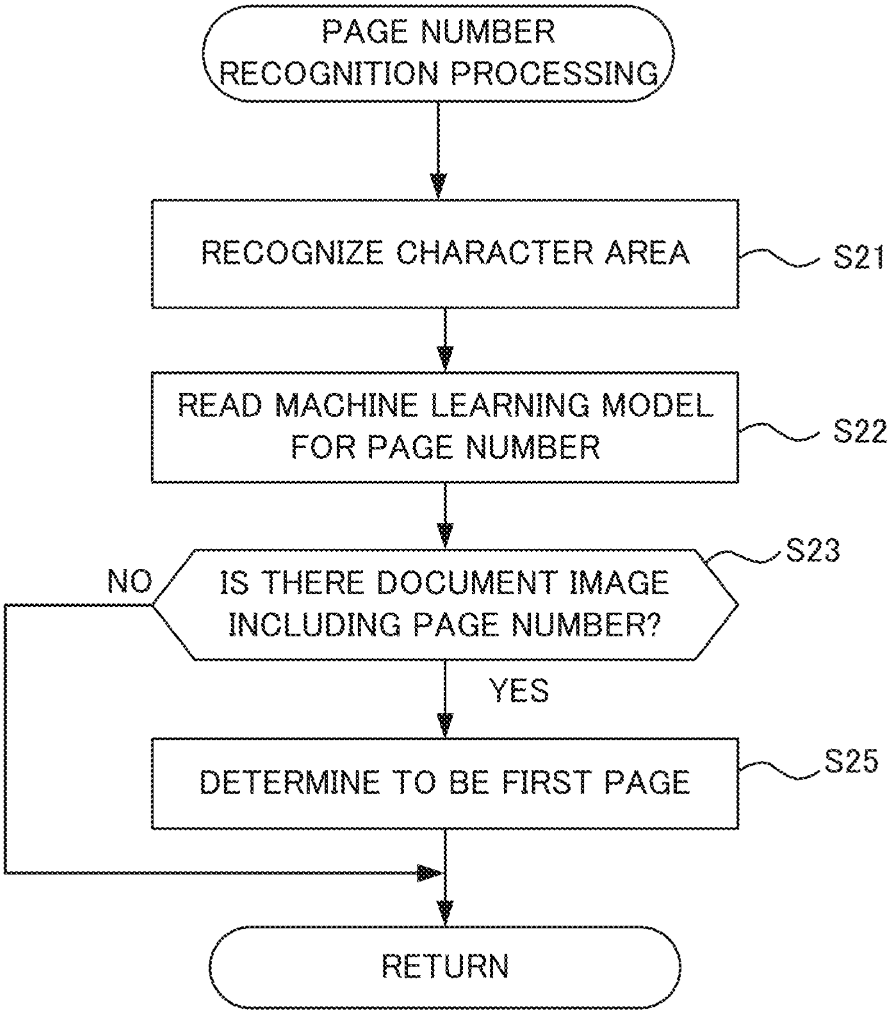
FIG. 3 is a flowchart showing a flow of page number recognition processing.

Next, page number recognition processing (processing S14 in the flowchart of FIG. 2) will be described. FIG. 3 is a flowchart showing a flow of the page number recognition processing. First, the page number recognizer 112 detects position information of the character area from the document image read by the image reading apparatus 13 using an optical character recognition technology (S21). The page number recognizer 112 recognizes characters from the document image read by the image reading apparatus 13 using, for example, an optical character recognition processing technology, extracts a character area consisting of a group of recognized characters, and acquires position information of the extracted character area. Specifically, the page number recognizer 112 extracts the character area from the document image, acquires coordinates of four locations (a top position on a left edge, a top position on a right edge, a bottom position on the left edge, and a bottom position on the right edge) of the extracted character area as the position information.

Next, the page number recognizer 112 reads the machine learning model for page number extraction 141 (S22), identifies a position where an image indicating the page number is assumed to be present in the character area of the document image using, for example, the position information of the character area of the document image, and determines whether there is an image indicating the page number from an area at the identified position. When the page number recognizer 112 determines that there is an image indicating the page number, the page number recognizer 112 extracts a character area including the image indicating the page number from the document image (S23). Further, the page number recognizer 112 extracts images indicating a plurality of types of page numbers as images indicating page numbers using the machine learning model for page number extraction 141. For example, the page number recognizer 112 extracts images indicating page numbers such as "-1-," "first page," and "p. 1" as the images indicating different types of page numbers using the machine learning model for page number extraction 141.

Further, the page number recognizer 112 may store predetermined page character (such as "first page") indicating a page number, detect whether or not a character located at the page character is present in the recognized character group, determine that the character area includes an image indicating the page number when there is the character, and extract the character area as a character area including the image indicating the page number.

When the page number recognizer 112 extracts the character area of the image indicating the page number (S23; YES), the page number recognizer 112 determines the document image including the page number to be the document image that becomes the first page of the document (S25). When the page number recognizer 112 does not extract a character area that seems to be a page number (S23; NO), the processing ends without a determination that the document image is the first page of the document.

The page number recognizer 112 executes the processing S21 to S25 for all the document images read by the image reading apparatus 13. When this processing ends, the controller 111 advances the processing to the processing S17 of the document division processing.

When the page number cannot be extracted in the processing S22 (S23; NO), the page number recognizer 112 ends the page number recognition processing, and the controller 111 advances the processing to the processing S17 of the document division processing.

Figure 4:
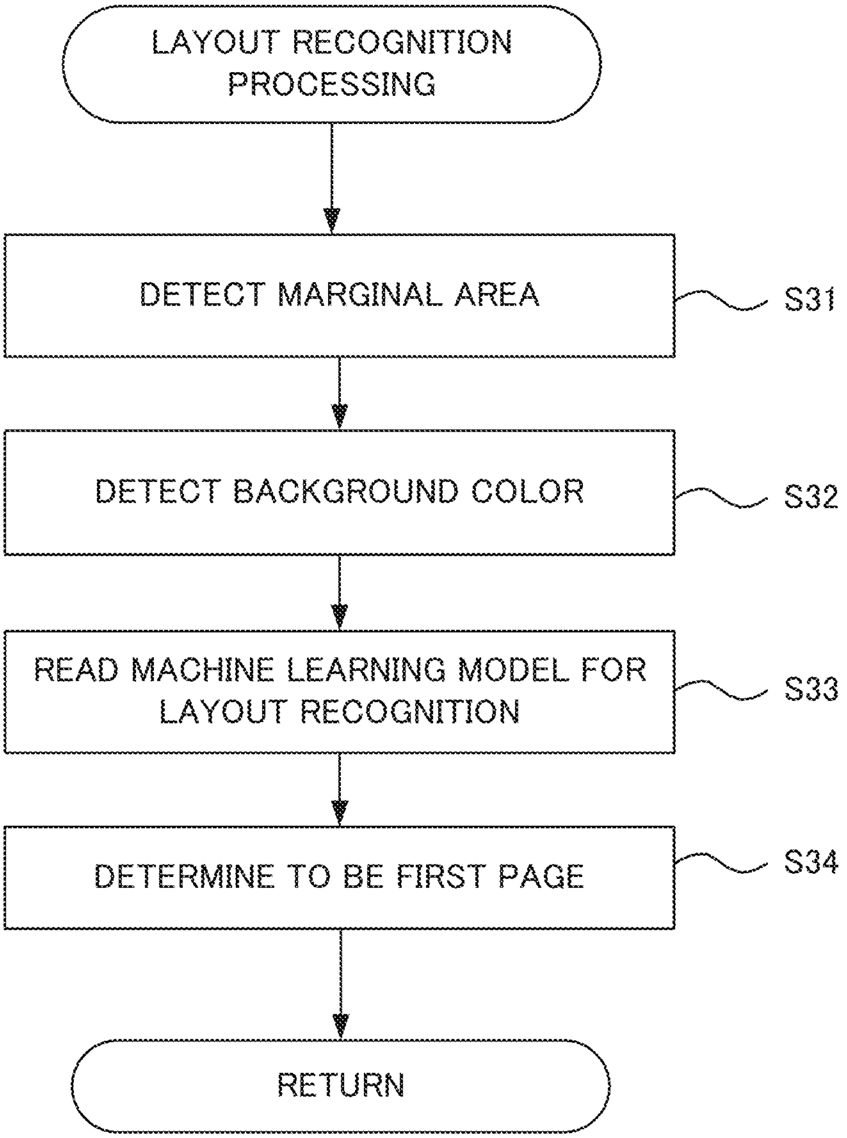
FIG. 4 is a flowchart showing a flow of layout recognition processing.

Next, layout recognition processing (processing S15 in the flowchart of FIG. 2) will be described. FIG. 4 is a flowchart showing a flow of the layout recognition processing. First, the layout recognizer 113 detects the marginal area of the document image (S31). A known technology is used to detect the marginal area. Subsequently, the layout recognizer 113 detects the background color of the document image (S32). For example, the layout recognizer 113 detects the brightness (pixel value) of a 2 mm wide area at a leading edge of the document image, calculates an average value thereof, and uses the average value as the brightness of the background color. The layout recognizer 113 stores the marginal area of the document image and a numerical value indicating the brightness of the background color for each document image of each read page.

The layout recognizer 113 reads the machine learning model for layout recognition 142 (S33). The layout recognizer 113 determines whether the latest document image and the document image one page before are the same document, on the basis of the marginal area of the document image and the numerical value indicating the brightness of the background color for the latest document image read at this point in time and the document image one page before, using the machine learning model for layout recognition 142 (S34). The layout recognizer 113 compares the marginal areas of the document images and the numerical values indicating the brightness of the background color with each other for the latest document image and the document image one page before, and determines the latest document image and the document image one page before to be the same document when a degree of matching is equal to or greater than a predetermined value (for example, 95%).

Here, when the layout recognizer 113 determines the latest document image and the document image one page before to be different documents, the layout recognizer 113 determines the latest document image to be the first page of the document. Further, when the layout recognizer 113 determines the latest document image and the document image one page before to be the same document, the layout recognizer 113 determines the latest document image to be a document image that is the next page after the document image one page before. The layout recognizer 113 executes processing S31 to S34 for all the document images. When the processing ends for all the document images, the controller 111 advances the processing to the processing S17 of the document division processing.

Figure 5:
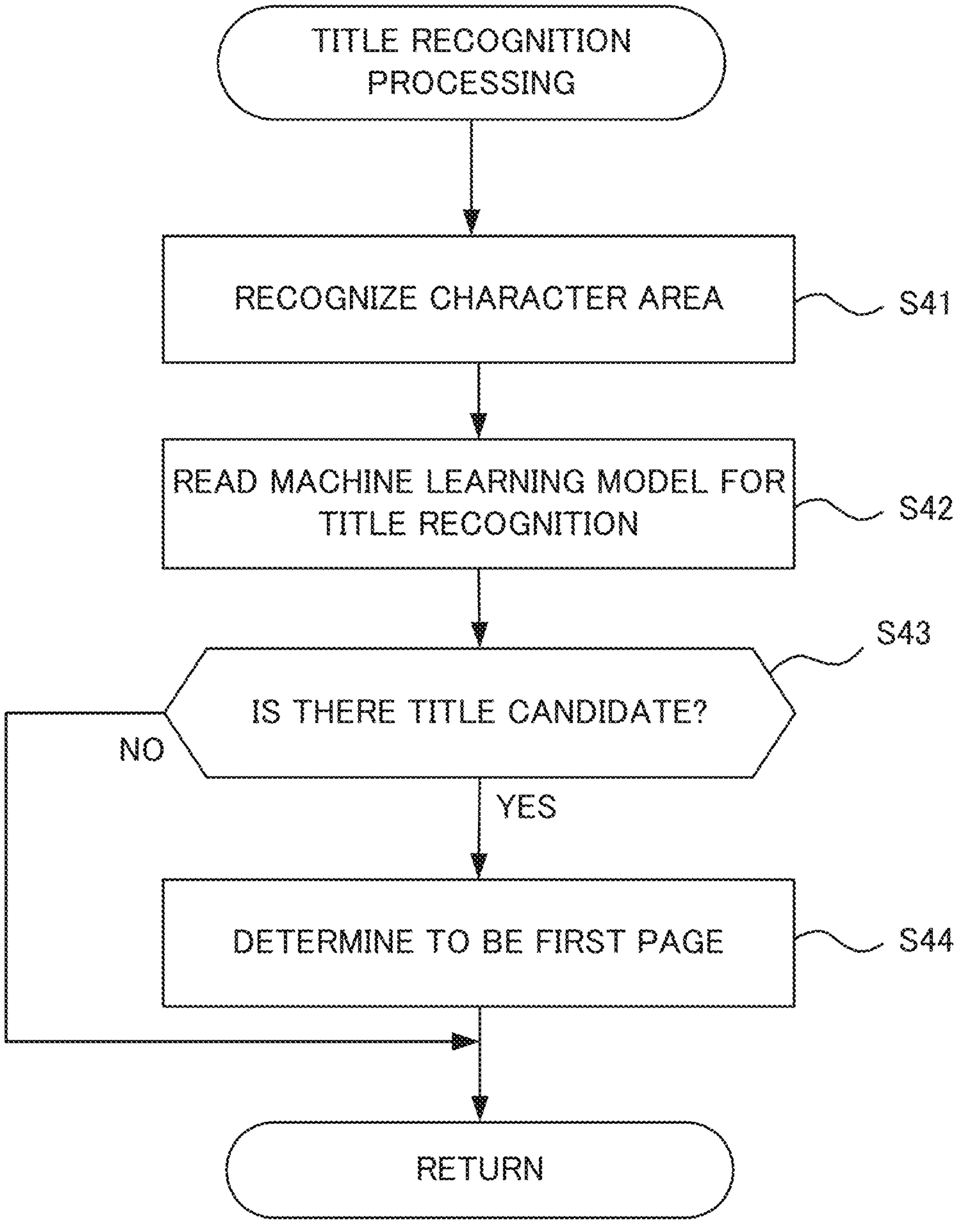
FIG. 5 is a flowchart showing a flow of title recognition processing.

Next, title recognition processing (processing S16 in the flowchart of FIG. 2) will be described. FIG. 5 is a flowchart showing a flow of the title recognition processing. First, the title recognizer 114 detects position information of a character area from the document image using the optical character recognition technology (S41). The position information of the character area is, for example, coordinates of four locations (a top position on a left edge, a top position on a right edge, a bottom position on the left edge, and a bottom position on the right edge) of the acquired character area.

Next, the title recognizer 114 reads the machine learning model for title recognition 143 (S42), and extracts a character area that becomes a title candidate from the character area of the document image using this machine learning model for title recognition 143. When the title recognizer 114 extracts the character area of the title candidate from the document image (S43; YES), the title recognizer 114 determines the document image to be the first page of the document (S44).

The title recognizer 114 executes processing S41 to S44 for all the document images read by the image reading apparatus 13. When the processing ends for all the document images, the controller 111 advances the processing to the processing S17 of the document division processing.

In order to improve the accuracy of a title determination, the title recognizer 114 may convert the character area of the title candidate extracted by the title recognizer 114 into text using the optical character recognition technology. In this case, the storage device 14 stores words (such as text indicating "bill," "Invoice," or the like) serving as title candidates in advance. The title recognizer 114 collates the text in the character area with the title candidates stored in the storage device 14. When there is text in the text area that matches the title candidate stored in the storage device 14, the title recognizer 114 determines the text to be a title.

The description will now return to the document division processing shown in the flowchart of FIG. 2. The divider 115 divides the document image of the document bundle read in the processing S12 on the basis of results of the first page determination performed in the processing S14, S15, and S16 (S17).

Figure 6:
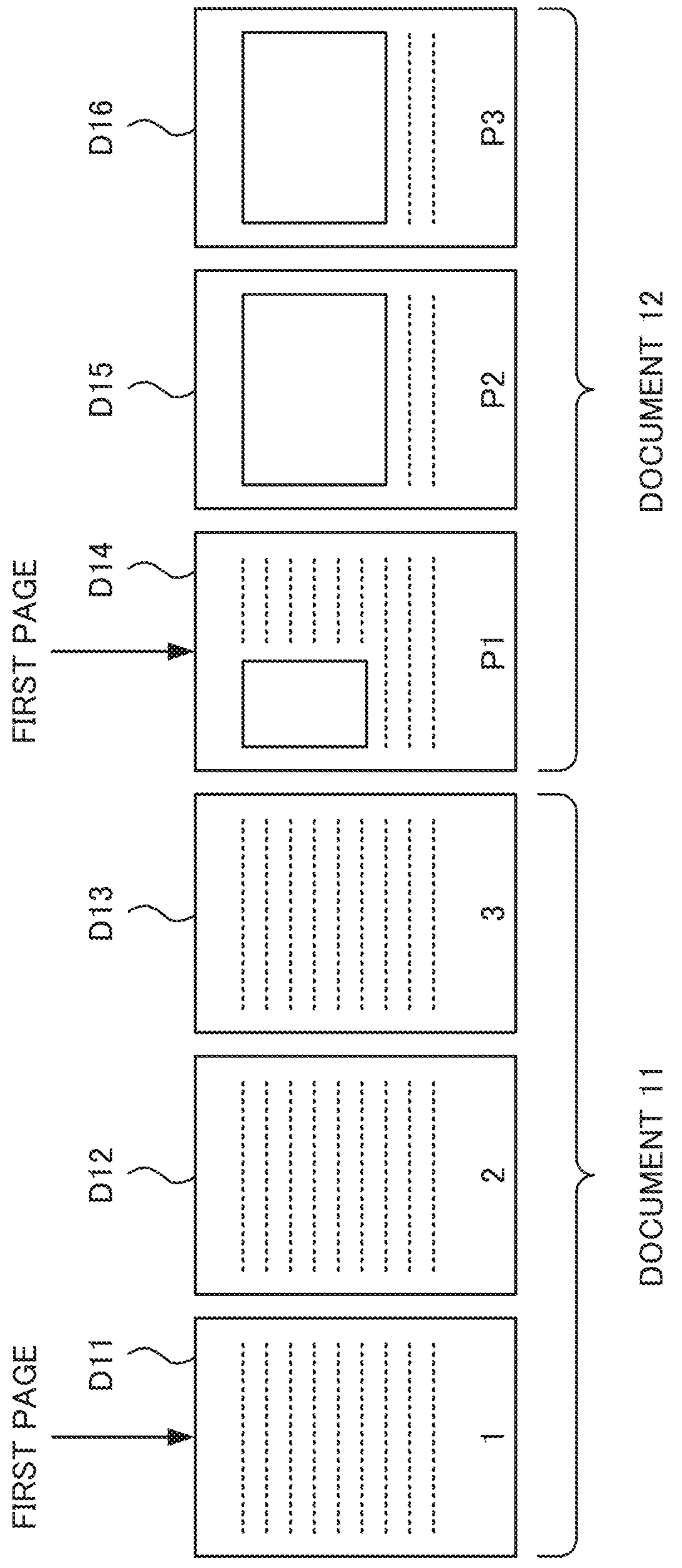
FIGS. 6 to 12 are diagrams illustrating division of a document image.
Figure 7:
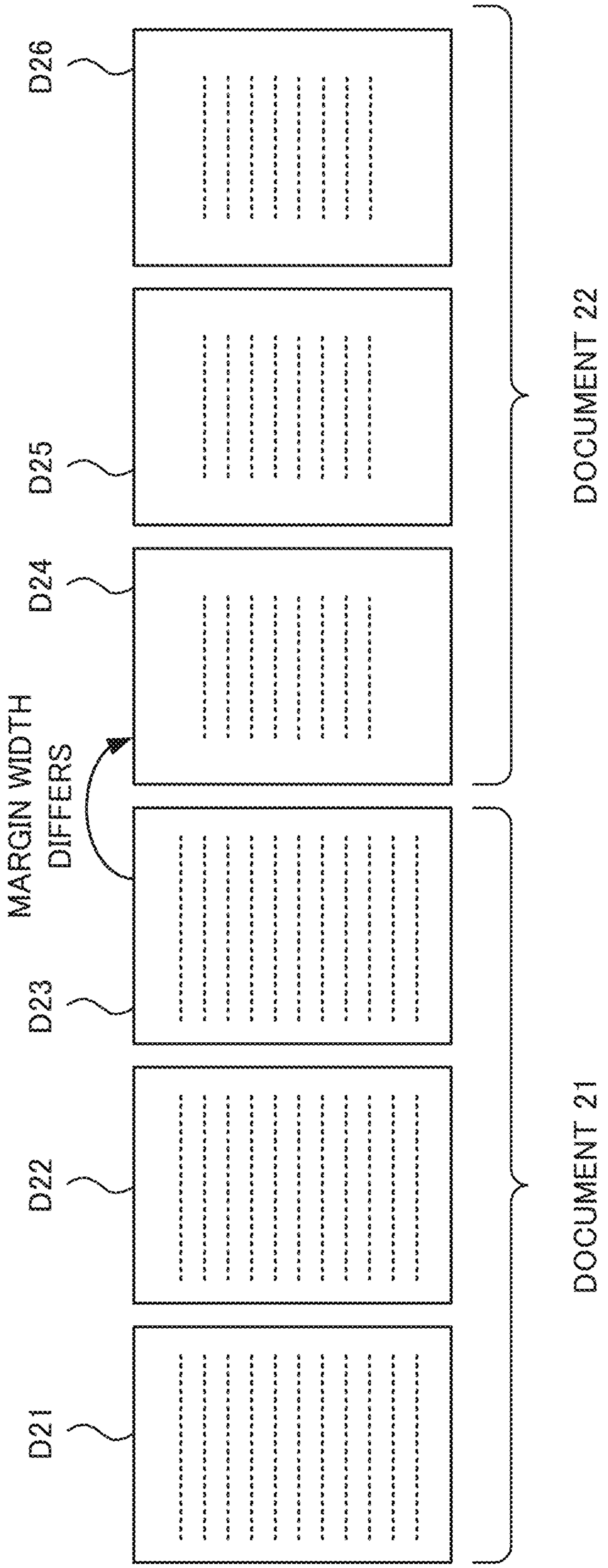
Figure 8:
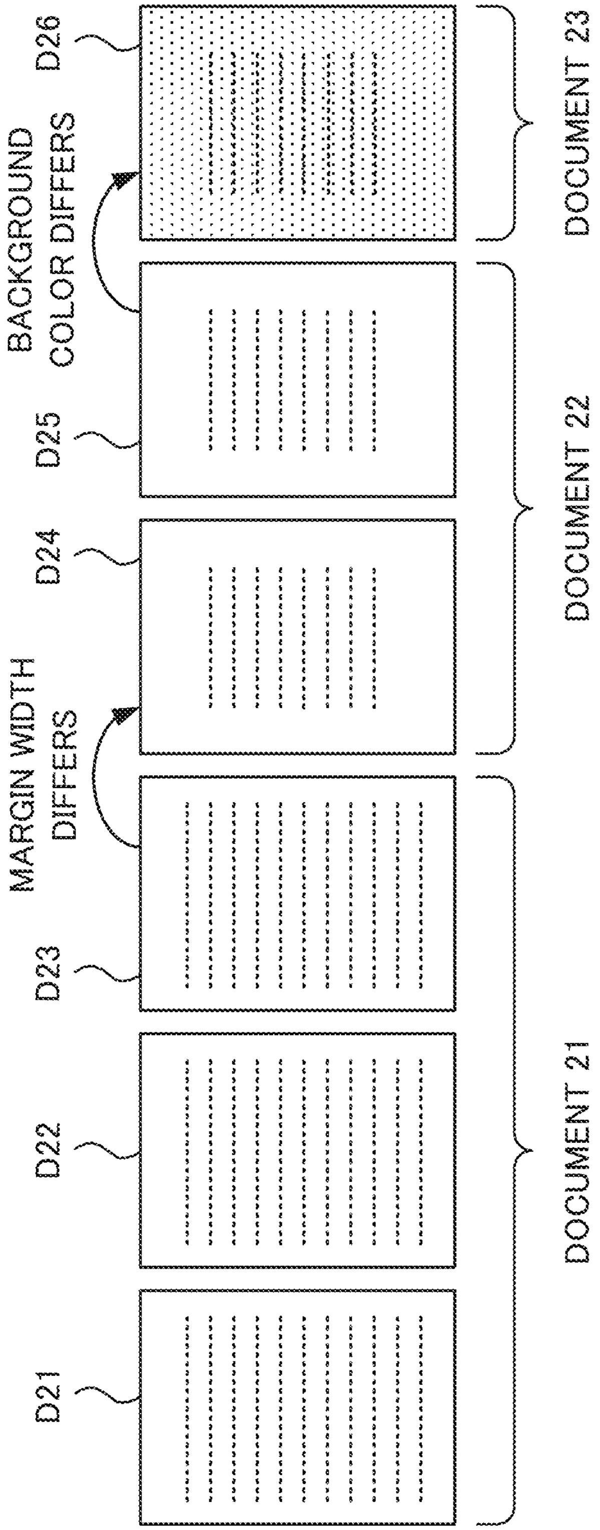

FIGS. 6 to 8 are diagrams illustrating the division of the document image. FIG. 6 is a diagram illustrating a case where a document image is divided on the basis of the page number recognition performed by the page number recognizer 112, and D11 to D16 are examples of document images. Here, it is assumed that the page number recognizer 112 determines the document image of the document first read by the image reading apparatus 13 to be the first page of the document.

When the page number recognizer 112 extracts a page number indicating a first page from the document image D11 and the document image D14 as a result of extracting page numbers from the document images D11 to D16, the page number recognizer 112 determines the document images D11 and D14 to be the first page of the document. When there are two document images serving as the first page in this way, the divider 115 determines that a document image group consisting of the document images of the plurality of the documents read by the image reading apparatus 13 is divided into two documents, and assigns each document image to either of the two documents. Since the controller 111 stores the reading order of the respective document images obtained by reading the document using the image reading apparatus 13, the divider 115 sets a subsequent document image in the reading order continuously following the determined document image of the first page as a document image of the next page after the document image of the first page, and classifies and divides the image into the same document as the document image of the first page, according to the reading order. When a plurality of types of page numbers are extracted by the page number recognizer 112, the divider 115 performs the dividing processing on each different type of page number.

Further, the divider 115 sets the document image from which the page number is first extracted as the first page, and classifies and divides the document image from which the same type of page number is subsequently extracted as a document image of a page following the document image from which the page number is first extracted in the reading order.

In the example illustrated in FIG. 6, the divider 115 divides the document images D11 to D13 from which the same type of page number has been extracted and the document images D14 to D16 from which different types of page numbers have been extracted as separate documents, converts the respective documents into separate files (document 11 and document 12), and stores the files in the storage device 14 (S18). Alternatively, the communication control device 15 converts the document 11 and the document 12 into different files and transmits the documents to an external terminal designated by the user.

FIG. 7 is a diagram illustrating a case where the document image is divided on the basis of the layout recognition performed by the layout recognizer 113. The layout recognizer 113 determines the document image D21 and the document image D24 to be the first page of the document as a result of detecting the marginal area or the background color from the document images D21 to D26. Since the document image D24 has the same background color and the different width of the marginal area compared to the document image D23 one page before, the layout recognizer 113 determines the document image D24 to be the first page of the document. Since the controller 111 stores the reading order of the respective document images obtained by reading the document using the image reading apparatus 13, the divider 115 sets a subsequent document image in the reading order continuously following the determined document image of the first page as a document image of a next page of the document image of the first page, and classifies and divides the image into the same document as the document image of the first page, according to the reading order.

Therefore, the divider 115 divides the document images D21 to D23 and the document images D24 to D26 as different documents, converts the documents into separate files (document 21 and document 22), and stores the files in the storage device 14 (S18). Alternatively, the communication control device 15 converts the document 21 and the document 22 into different files and transmits the documents to the external terminal designated by the user.

FIG. 8 is a diagram illustrating another example in which the document image is divided on the basis of the layout recognition performed by the layout recognizer 113. The layout recognizer 113 determines the document image D21, the document image D24, and the document image D26 to be the first pages of the document as a result of detecting the marginal areas and background colors from the document images D21 to D26. Since the document image 24 has the same background color as the document image D23 one page before, but has the different width of the marginal area from the document image D23 one page before, the layout recognizer 113 determines the document image D24 to be the first page of the document, and since the document image 26 is the same marginal area as the page document image D25 one page before, but has the different background color from the page document image D25 one page before, the layout recognizer 113 determines the document image D26 to be the first page of the document. In this case as well, since the controller 111 stores the reading order of the respective document images obtained by reading the document using the image reading apparatus 13, the divider 115 sets a subsequent document image in the reading order continuously following the determined document image of the first page as a document image of a next page of the document image of the first page, and classifies and divides the image into the same document as the document image of the first page, according to the reading order.

Therefore, the divider 115 divides the document images D21 to D23, the document images D24 and D25, and the document image D26 as different documents, converts the documents into separate files (document 21, document 22, and document 23), and stores the files in the storage device 14 (S18). Alternatively, the communication control device 15 converts the document 21, the document 22, and the document 23 into different files and transmits the documents to the external terminal designated by the user.

As described above, according to the embodiment, when the image reading apparatus 13 reads a document bundle including a plurality of types of documents, it is possible to easily classify the document images into documents and store the document images as image data. Therefore, it is possible to perform the classification without manually classifying the documents and then cause the reading device to read the documents. Further, it is possible to efficiently and accurately determine whether or not each document image obtained by reading is treated as the same document, and to easily classify the document images into the same document or different documents depending on document content, by performing the document classification depending on the presence or absence of a page number within a document, the presence or absence of a title, characteristics of each document such as a marginal area or background color, or the like determined through page number extraction, layout recognition, title recognition, or the like.

Further, it is possible to perform the division according to characteristics of the document image according to a need of the user by the user selecting a method of determining whether or not each document image is the first page from among a method of using the page number of the document image, a method of using the marginal area and the background color of the document image, and a method of using the title included in the document image.

Here, with the method described in BACKGROUND, there was a problem that a plurality of documents could not be divided unless there was a workflow execution history. On the other hand, according to the embodiment, it is possible to divide the document image into documents by simply reading the document bundle. Therefore, according to the embodiment, it is possible to reduce the effort of manually classifying documents and then causing the reading device to read the documents.

Figure 9:
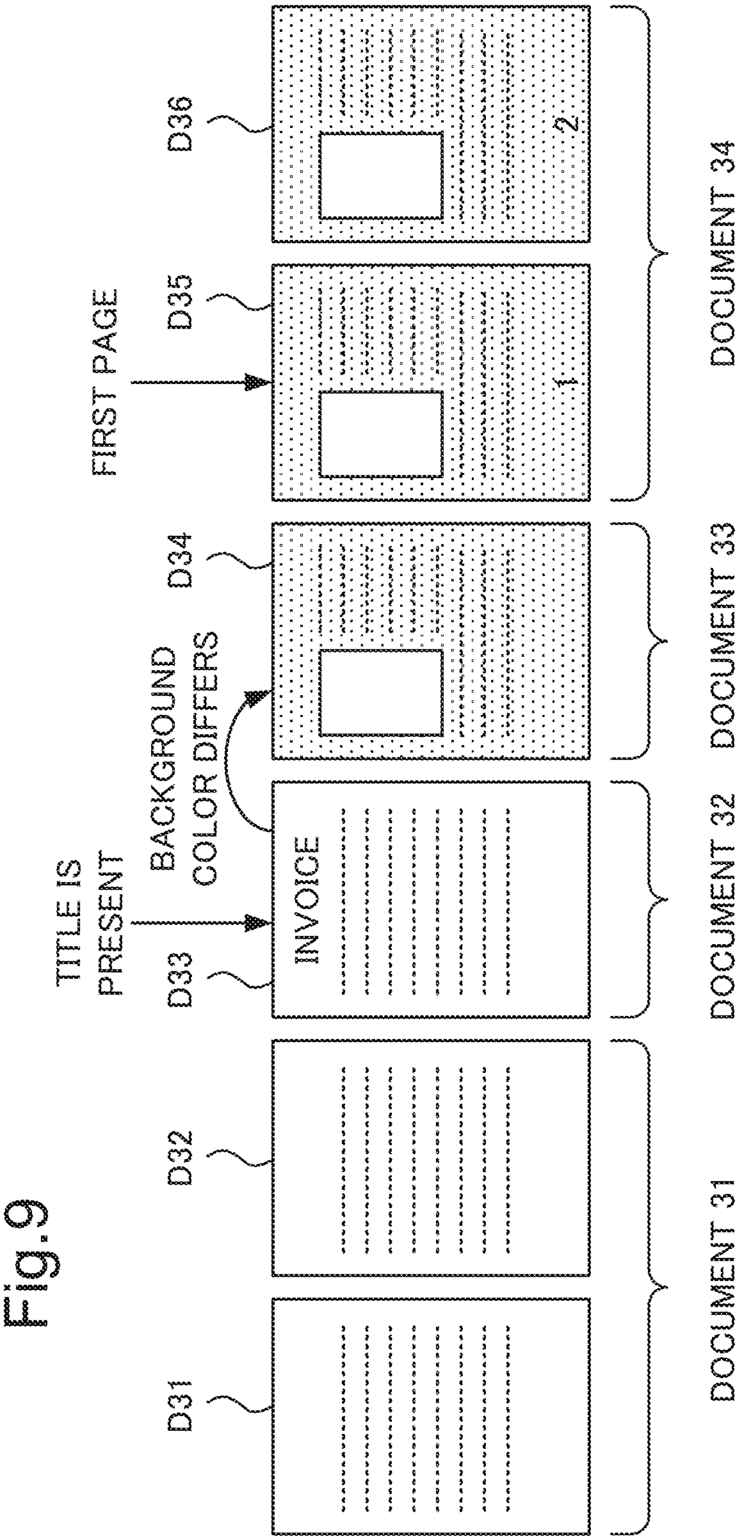

As the document division method, a plurality of combinations of the page number recognition, the layout recognition, and the title recognition may be used. In this case, the determinations of the page number recognizer 112, the layout recognizer 113, and the title recognizer 114 are performed on all the document images obtained by reading. FIG. 9 is a diagram illustrating a case where a document image is divided through the combination of the page number recognition, the layout recognition, and the title recognition.

A case where document images D31 to D36 having content as illustrated in FIG. 9 are obtained by reading a plurality of documents using the image reading apparatus 13 will be described.

In this case, the layout recognizer 113 determines the marginal areas and the background colors of the document images D31 to D33 to be the same. The title recognizer 114 detects a title candidate "Invoice" from the document image D33. The layout recognizer 113 determines the marginal areas and the background colors of the document images D34 to D36 to be the same. Further, the page number recognizer 112 extracts a page number indicating a first page from the document image D35 and a page number indicating a second page from the document image D36 as a result of extracting page numbers from the document images D31 to D36.

In this case, the page number recognizer 112 determines the document image D35 to be the first page of the document as a result of extracting the page numbers from the document images D31 to D36.

Further, since the background color of the document image D34 is different from that of the document image D33 one page before as a result of the layout recognizer 113 detecting the marginal areas and the background colors from the document images D31 to D36, the layout recognizer 113 determines the document image D34 to be the first page of the document.

Further, the title recognizer 114 extracts title candidates from the document images D31 to D36, and as a result, when the title recognizer 114 detects a title candidate of "Invoice" from the document image D33, the title recognizer 114 determines the document image D33 to be the first page of the document.

In this case as well, the divider 115 sets a subsequent document image in the reading order continuously following the determined document image of the first page as a document image of a next page of the document image of the first page, and classifies and divides the image into the same document as the document image of the first page, according to the reading order.

From this result, the divider 115 divides the document images D31 and D32 among the document images D31 to D36 as a document 31, the document image D33 as a document 32, the document image D34 as a document 33, and the document images D35 and D36 as a document 34, and stores the respective documents as separate files the storage device 14 (S18). Alternatively, the communication control device 15 converts the respective divided documents into different files and transmits the documents to the external terminal designated by the user. It is possible to classify document images into documents with higher accuracy through the combination of the document division methods in this way.

Figure 10:
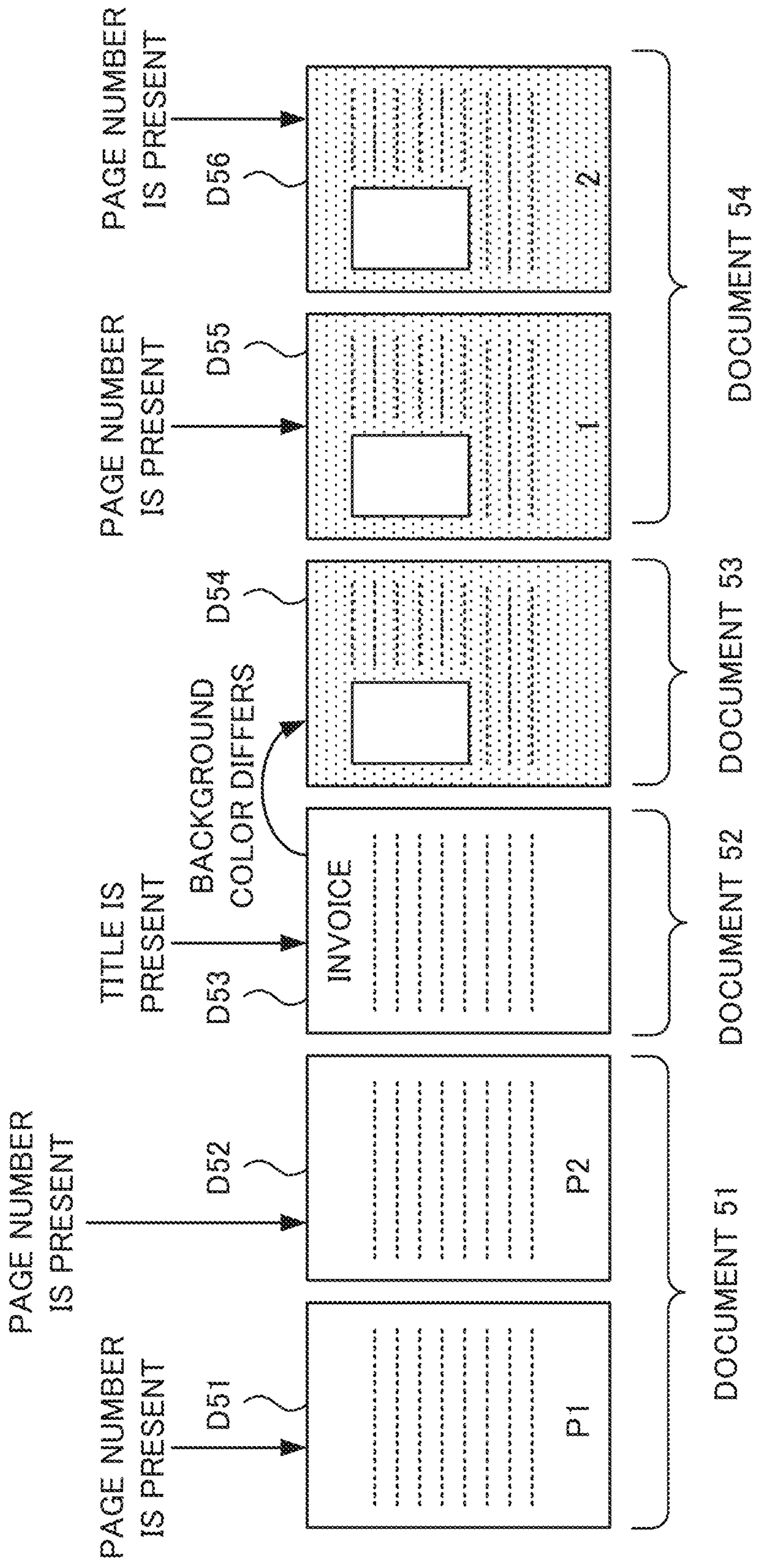
Figure 11:
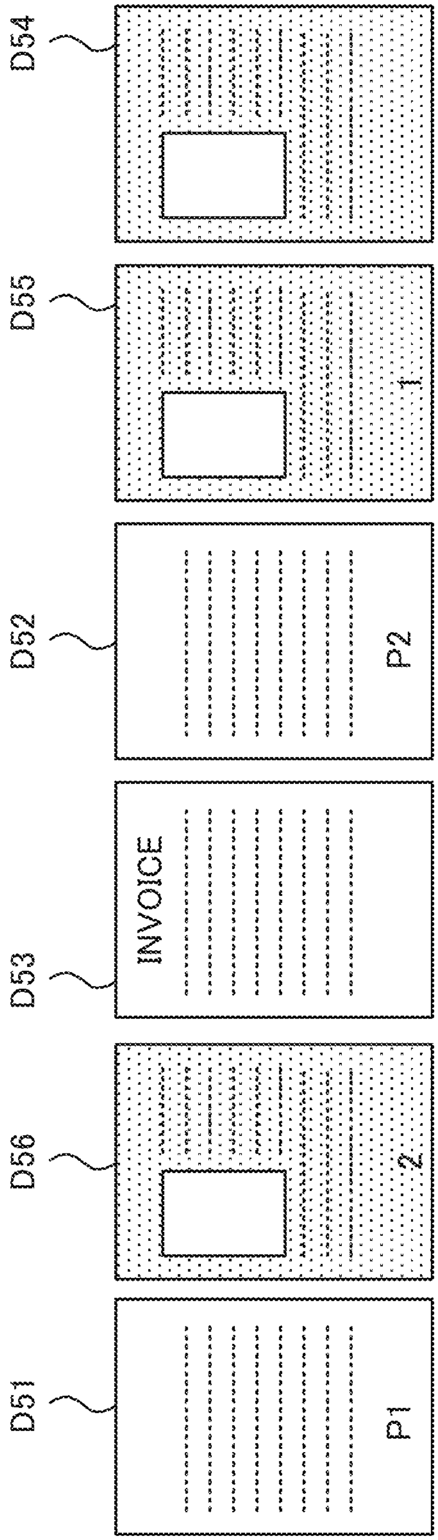
Figure 12:
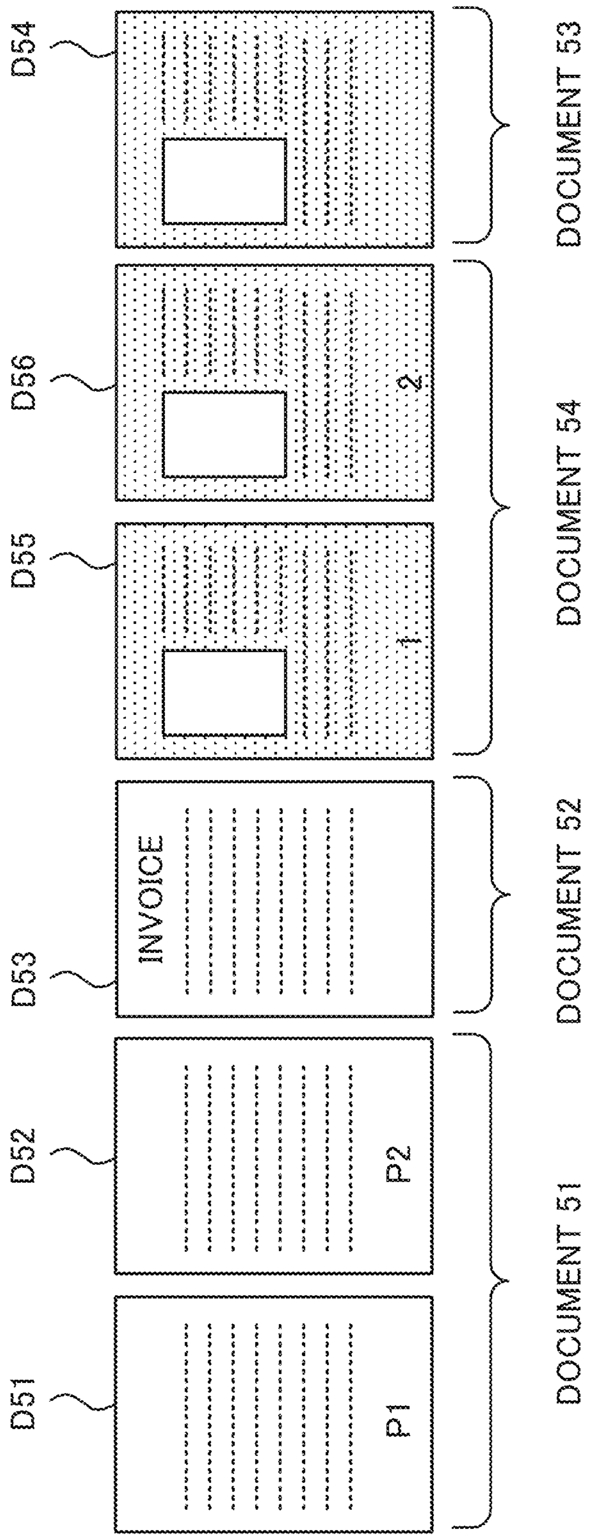

Further, when the page number recognizer 112 extracts images indicating a plurality of types of page numbers as the images indicating the page number, determines a page order of the same types of page numbers, and extracts the image indicating the page number (for example, also recognizes numbers indicating the page numbers) using the machine learning model for page number extraction 141, it is possible to rearrange the document images in an assumed page order of each of the document a plurality of original document documents as shown in FIG. 12, and classify the document images into respective documents including the document images of the document documents, for example, even when the plurality of types of document documents 51 to 54 illustrated in FIG. 10 are placed on the image reading apparatus 13 with pages of the respective documents being mixed, and the image reading apparatus 13 is caused to read the mixed documents, and the document images of the document documents are read in order illustrated in FIG. 11.

While the present disclosure has been described in detail with reference to the embodiments thereof, it would be apparent to those skilled in the art that the various changes and modifications may be made therein within the scope defined by the appended claims.

What is claimed is:

1. An image reading apparatus comprising:

an image reading apparatus configured to acquire document images of a plurality of pages obtained by reading a document bundle including a plurality of documents one by one; and a control device including a processor, and functioning as:

a page number recognizer configured to recognize a page number of each document image and determine a first page of the document in the document images of the plurality of pages acquired by the image reading apparatus;

a layout recognizer configured to recognize a marginal area width and background color of each document image and determine the first page of the document;

a title recognizer configured to recognize a title from each document image and determine the first page of the document;

a controller configured to cause the page number recognizer, the layout recognizer, or the title recognizer to determine whether each document image is the first page of the document; and a divider configured to divide the document images into the same type of documents using a result of the determination as to whether or not each document image is the first page of the document by the page number recognizer, the layout recognizer, or the title recognizer that has performed the determination, by the processor executing a control program, wherein the controller causes the page number recognizer, the layout recognizer, and the title recognizer to determine whether each document image is the first page of the document, and the divider divides the document images into the same type of documents using a determination result that is a combination of two or more determination results selected by a user from among results of determinations as to whether or not each of the document images is the first page of the document in the page number recognizer, the layout recognizer, and the title recognizer, wherein the page number recognizer extracts a plurality of types of page numbers as the page number, and determines a page order of the same type of page numbers to recognize the page number, and the divider divides the document image into the same type of documents using a determination result serving as a result of a determination as to whether each document image after the page number recognizer extracts each of the plurality of types of page numbers and determines a page order of the same type of page numbers is the first page of the document, and a result of a determination as to whether each document image is the first page of the document by the layout recognizer and the title recognizer.

2. The image reading apparatus according to claim 1, wherein, when there are plurality of document images determined to be the first page, the divider divides and classifies the document images of the plurality of pages into a plurality of documents.

* * * * *